United States Patent [19]
Zehngut et al.

[11] Patent Number: 5,339,333
[45] Date of Patent: Aug. 16, 1994

[54] FSK DEMODULATOR USING SIGNAL TRANSITIONS

[75] Inventors: Ilan Zehngut, Ra'anana; Uzi Zakai, Raut, both of Israel

[73] Assignee: Motorola, Inc., Schaumburg, Ill.

[21] Appl. No.: 10,955

[22] Filed: Jan. 29, 1993

[30] Foreign Application Priority Data

Feb. 20, 1992 [GB] United Kingdom ............ 9203704.3

[51] Int. Cl.$^5$ .................... H03D 3/00; H04L 27/14
[52] U.S. Cl. ................................. 375/88; 329/301
[58] Field of Search ................ 375/88, 90, 91, 582; 329/300, 303, 301

[56] References Cited

U.S. PATENT DOCUMENTS

| | | | |
|---|---|---|---|
| 4,270,208 | 5/1981 | MacDavid | 375/76 |
| 4,414,675 | 11/1983 | Comroe | 375/90 |
| 4,551,846 | 11/1985 | Takeda et al. | 375/88 X |
| 4,694,471 | 9/1987 | Blesser | 375/88 X |
| 5,197,084 | 3/1993 | Furhman | 375/88 |

Primary Examiner—Stephen Chin
Assistant Examiner—Bryan Webster
Attorney, Agent, or Firm—Susan L. Lukasik; Steven G. Parmelee; Anthony J. Sarli, Jr.

[57] ABSTRACT

An FSK demodulator is provided comprising means for receiving and digitizing an FSK signal (such as a signal comprising two frequencies f1 and f2 in which first and second logic states are represented by first and second periods of different durations). First, second, third and fourth consecutive transitions of the signal are identified and the times of said transitions are identified. A first period between the first and third transitions is calculated, as is a second period between the second and fourth transitions. A change of frequency in the signal is indicated when the first and second periods lie on opposite sides of a first threshold period ($\tau$) and no change of frequency is indicated when the first and second periods lie on the same side of the threshold period ($\tau$). In a further aspect of the invention, a transition is rejected as illegal when two consecutive transitions occur within a predetermined period of time.

10 Claims, 1 Drawing Sheet

FSK DEMODULATOR USING SIGNAL TRANSITIONS

BACKGROUND OF THE INVENTION

This invention relates to FSK (Frequency Shift Keying) demodulators, for example those in which a signal to be demodulated comprises two frequencies F1 and F2, in which first and second logic states are represented by the first and second pulse durations.

SUMMARY OF THE PRIOR ART

In supervisory control and data acquisition products, FSK modulation is popular for communication between remote units and a central unit. Many other systems use FSK modulation.

A typical FSK modulation scheme employs two frequencies, wherein a change of frequency signifies the end of one pulse and the beginning of another pulse and the duration of a pulse determines the logic state. For example, a logic "zero" may be defined as a pulse of duration T and a logic "one" may be defined as a pulse of duration 2T.

In the past demodulation of FSK signals such as that described above have been implemented by hardware. The hardware implementation consists of analog filters, an analog or digital phase-locked loop, comparators and digital components and is complex and expensive.

SUMMARY OF THE INVENTION

According to a first aspect of the present invention, an FSK demodulator is provided comprising means for receiving and digitizing an FSK signal; means for identifying first, second, third and fourth consecutive transitions of the signal and the times of said transitions, means for calculating a first period between the first and third transitions and a second period between the second and fourth transitions, means for indicating a change of frequency in the signal when the first and second periods lie on opposite sides of a first threshold period ($\tau$) and no change of frequency when the first and second periods lie on the same side of the threshold period ($\tau$).

The demodulator may be arranged to demodulate an FSK signal comprising two frequencies f1 and f2 in which first and second logic states are represented by first and second periods of different durations.

The first threshold may be the period average for periods between consecutive transitions, or the frequency average or the geometric average for periods between consecutive transitions.

According to a second aspect of the present invention, an FSK demodulator is provided comprising means for receiving and digitizing an FSK signal; means for identifying transitions of the signal and the times of said transitions; means for rejecting a transition as illegal when two consecutive transitions occur within a predetermined period of time, and means for identifying changes of state in the signal from transitions not rejected as illegal.

The invention provides a software implementation of an FSK demodulator requiring simple operations such as add/subtract operations. The software lends itself to use in a general purpose microprocessor, with relatively low loading on the processor.

The demodulation process is more accurate than analog hardware and does not require trimming, thus saving on maintenance. The preferred implementation is flexible. Parameters can be changed by software and no change in component values is required. By changing only one parameter, the algorithm can be applied to any FSK frequencies.

A preferred embodiment of the invention will now be described by way of example, with reference to the drawings.

DETAILED DESCRIPTION OF THE PREFERRED EMBODIMENT

Figure 1:
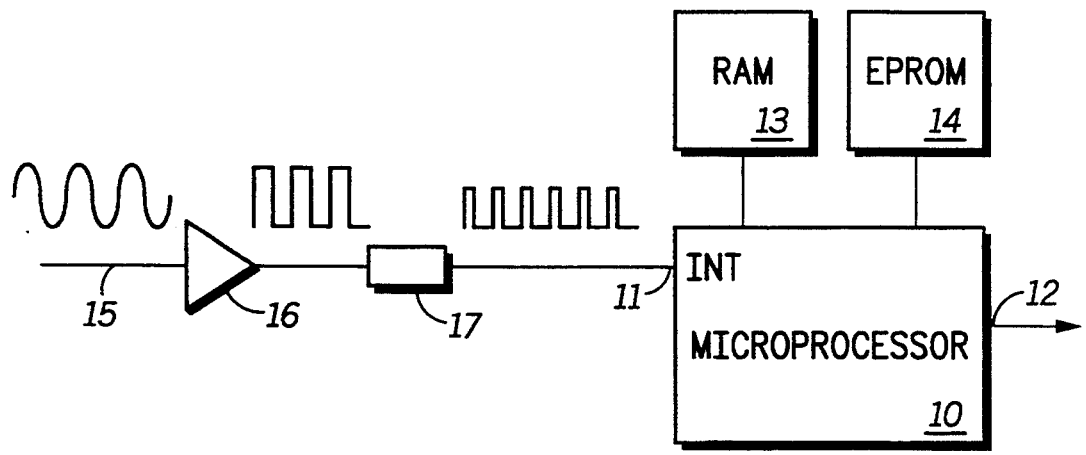
FIG. 1 shows an FSK demodulator in accordance with the preferred embodiment of the invention.

Referring to FIG. 1, there is shown a microprocessor 10 having an interrupt input 11 and an output 12. The microprocessor 10 has RAM memory 13 and EPROM memory 14. An FSK signal input 15 is connected to the interrupt input 11 via an amplifier 16 and a monostable 17.

In operation, an FSK signal is received on the input 15 at a rate of typically 600 baud. This signal represents a logic "zero" as a pulse of duration T (where T = 1/600 seconds) and a logic "one" as a pulse of duration 2T. A change of logic slate between pulses is signified by a change of frequency. The signal comprises two frequencies which are typically F1 = 1500 Hz and F2 = 900 Hz. A frame synchronization (FS) pulse of duration 4T indicates a start or end of a frame.

Figure 2:
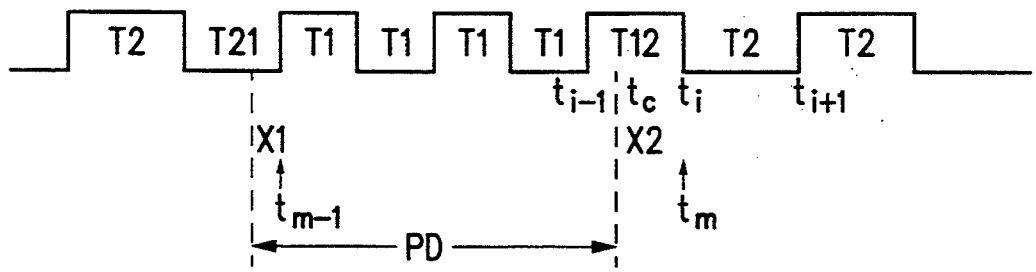
FIG. 2 shows a hard-limited FSK signal from which a bit stream is to be extracted and FIG. 3 shows a bit stream with different pulse durations representing alternate logic states.

The signal is amplified in amplifier 16 to the saturation level of the amplifier, giving a "hard limited" signal as shown in FIG. 2. This signal is fed to the monostable 17, which outputs a pulse for each transition of the signal, which in turn are fed to the interrupt input of the microprocessor 10.

Figure 3:
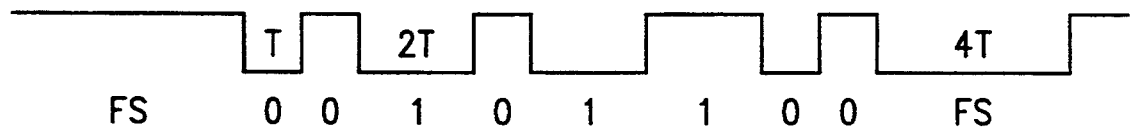

The pulses on the interrupt 11 which signify the transitions of the signal of FIG. 2 are used to demodulate the signal and provide the bit stream of FIG. 3 in a manner described below.

Referring to FIG. 2, the hard limited FSK signal's transitions are sampled by the microprocessor 10 at times $T_i$ (i=0,1,2,3 ...).

Let us define $$T_i = t_i - t_{i-1} \qquad (1)$$

Consider $$T1 = \frac{1}{2 \times f1} \text{ and } T2 = \frac{1}{2 \times f2} \quad T1 < T2 \qquad (2)$$

where f1 and f2 are the FSK signal frequencies

Let us define the threshold as follows:

$$\tau = \frac{T1 - T2}{2} \qquad (3)$$

We decide that a frequency change occurs when sign $$(T_{i+1} + T_i - 2\tau) = sign\ (T_{i-1} + T_i - 2\tau) \qquad (4)$$

In effect, the decision represented by equation (4) indicates a change of logic state in the signal when, for first, second, third and fourth consecutive transitions, a first period between the first and third transitions and a second period between the second and fourth transitions lie on opposite sides of a threshold period. No change of logic state is indicated when the first and second periods lie on the same side of the threshold.

The manner of calculating the time of frequency change is as follows.

Assuming that frequency change in the continuous phase FSK signal occurs in any particular phase, there are two cases which satisfy inequality (4):

1. $T_{i-1} = T2$  2. $T_{i-1} = T1$
   $T_i = T21$      $T_i = T12$
   $T_{i+1} = T1$   $T_{i+1} = T2$ where $T1 < T12 < T2$ and $T1 < T21 < T2$ Let us define $T_c$ as the time when frequency change occurs, which is within T12 duration time (or T21).
So, by defining $$X1 = t_i - T_c \text{ (for T21)} \tag{5}$$

$$X2 = t_i - T_c \text{ (for T12)} \tag{6}$$

and by defining $\alpha 1$ and $\alpha 2$ so that $$X1 = \alpha 1 \times T1 \tag{7}$$

$$X2 = \alpha 2 \times T2 \tag{8}$$

we get $$T21 = \alpha 1 \times T1 + (1 - \alpha 1) \times T2 \tag{9}$$

$$T12 = \alpha 2 \times T2 + (1 - \alpha 2) \times T1 \tag{10}$$

From equations (9) and (10) we get also $$T12 + T21 = T1 + T2 \tag{11}$$

$$\alpha 1 = \frac{T21 - T2}{T1 - T2} \tag{12}$$

$$\alpha 2 = \frac{T12 - T1}{T2 - T1} \tag{13}$$

By manipulation we get $$\alpha 1 = \frac{T21 + T1 - (T1 + T2)}{T1 - T2} = \frac{T21 + T1 - 2\tau}{T1 - T2} \tag{14}$$

$$\alpha 2 = \frac{T12 + T2 - (T1 + T2)}{T2 - T1} = \frac{T12 + T2 - 2\tau}{T2 - T1} \tag{15}$$

But, in case of frequency change:

$$t_{i+1} - t_{i-1} = T_{i+1} + T_i = T21 + T1 \text{ (for case 1.)} \tag{16}$$
$$= T12 + T2 \text{ (for case 2.)}$$

So by defining the following $$a_i = t_{i+1} - t_i - \tau \tag{17}$$

$$r_i = a_i + a_{i-1} \tag{18}$$

therefore $$r_i = t_{i+1} - t_{i-1} - 2\tau \tag{19}$$

inequality (4) becomes $$\text{sign }(r_i) = \text{sign }(r_{i-1}) \tag{20}$$

Let us define $$K1 = \frac{T1}{T2 - T1} \tag{21}$$

$$K2 = \frac{T2}{T2 - T1} \tag{22}$$

From equations (5), (6), (7), (8), (14), (15), (16), (19), (21) and (22) we get $$\begin{aligned} Tc &= t_i + r_i \times K1 \text{ if } r_i < 0 \\ &= t_i - r_i \times K2 \text{ if } r_i > 0 \end{aligned} \tag{23}$$

As a result, Tc, which is the time of frequency change, can be easily calculated (and implemented by software) for FSK detector applications.

In the following paragraphs, it is shown that there is an even simpler way to calculate the duration of the frequency (the time between consecutive frequency changes).

Let us refer to the $\{t_i\}$ samples from where frequency changes have been detected, as $\{t_m\}$.

The duration, PD, is given by the following equation:

$$\begin{aligned} PD &= t_m - t_{m-1} + X1 - X2 \text{ if } f1 \\ &= t_m - t_{m-1} + X2 - X1 \text{ if } f2 \end{aligned} \tag{24}$$

Let us represent the samples $\{r_i\}$, where frequency changes have been detected, as $\{r_m\}$.

From equation (16) and (19) we get for f1

$$r_m - r_{m-1} = T2 + T12 - 2\tau - (T1 + T21 - 2\tau) = T2 - T21 + (T12 - T1) \tag{25}$$

But, from equations (7), (8), (9) and (10)

$$X2 - X1 = T2 - T21 - T12 - T1 \tag{26}$$

Therefore $$r_m - r_{m-1} - 2(X2 - X1) \tag{27}$$

and $$X2 - X1 = \frac{r_m - r_{m-1}}{2} \tag{28}$$

In the same manner, we get for f2

$$X1 - X2 = \frac{r_m - r_{m-1}}{2} \tag{29}$$

Finally, a general formula can be derived to calculate the duration:

$$PD = t_m - t_{m-1} - \frac{r_m - r_{m-1}}{2} \quad (30)$$

The above calculation requires only add and subtract operations. Divide-by-two can be accomplished by a shift right operator. The implementation of the calculation is therefore very straightforward in a general purpose microprocessor 10.

In principle, the procedure is as follows:
For every i
Get $t_i$ $$a_i = t_i - t_{i-1} - \tau$$

$$r_i = a_i + a_{i-1}$$

if sign ($r_i$) = sign ($r_{i-1}$) then $$m = m + 1$$

$$t_m = t_{i-1}$$

$$r_m = r_i$$

$$PD = t_m - t_{m-1} - (r_m - r_{m-1})/2$$

end
exit

It should be noted that the procedure mentioned above is described in a free language. Also, the usage of indices is done in conformance with the theoretical explanation as well as for ease of understanding, and it does not imply a specific implementation.

It can be seen from the procedure described above, that it can operate on any pair of frequencies (f1, f2) just by determining the value of one parameter - $\tau$.

The threshold $\tau$ is selected to achieve the lowest probability of error.

An appropriate value for $\tau$ will be the period average which is given by the following equation $$\tau 1 = \frac{T1 + T2}{2} \quad (31)$$

However one may choose other values for $\tau$ such as the frequency average which is given by the following equation $$\tau 2 = \frac{1}{f1 + f2} - 2\left[\frac{1}{T1} + \frac{1}{T2}\right] - 1 \quad (32)$$

or, the geometric average which is given by the following equation $$\tau 3 = \sqrt{T1 \times T2} \quad (33)$$

Generally, the difference between the thresholds mentioned above will be small enough so as not to affect the performance of the demodulator substantially.

When implemented on a 6805 processor at a clock rate of 3.6864 MHz, the time consumption is about 30% of the CPU time.

Under noise conditions, transitions may occur on the input within a short period of time. In accordance with a second aspect of the invention, when the time between two consecutive transitions is less than a predetermined minimum, one of the transitions is treated as illegal. By adding the feature of discarding these illegal transitions, an improvement in performance is noted. Generally the second of the consecutive transitions can be taken as the illegal transition, however a decision as to which transition to be discarded can be made dependent on the relative periods between the immediately preceding and immediately following transitions.

When tested with an RNET (trade mark) radio, a bit error rate of less than $10^{-6}$ was achieved a RF level of $-155$ DBM with an alarm reporter (trade mark) product and at an RF level of $-133$ DBM with an MEIC1000 (trade mark) radio.

We claim:

1. An FSK (Frequency Shift Keying) demodulator comprising:
    means for receiving and digitizing an FSK signal;
    processing means arranged to identify first, second, third and fourth consecutive transitions of the FSK signal and the times of said transitions; calculate a first period between the first and third transitions and a second period between the second and fourth transitions and indicate a change of frequency in the signal when the first and second periods lie on opposite sides of a threshold period and no change of frequency when the first and second periods lie on the same side of the threshold period.

2. A demodulator according to claim 1, wherein the processing means are responsive to changes of frequency in the FSK signal, for storing a time indication for a transition immediately following each change of frequency.

3. A demodulator according to claim 2, wherein the processing means are arranged to calculate a pulse generation time from consecutive stored transition time indications for consecutive changes of frequency in the FSK signal.

4. A demodulator according to claim 3, wherein the processing means are arranged to make a comparison between the pulse duration time and a second threshold period and providing a logic state output depending on said comparison.

5. A demodulator according to claim 4, wherein the processing means are arranged to make a comparison between the pulse duration time and a third threshold period, greater than said second threshold period and providing a frame synchronization indication depending on said comparison.

6. A demodulator according to claim 1, wherein the first threshold period is the theoretical period average for periods between consecutive transitions.

7. A demodulator according to claim 1 for demodulating an FSK signal comprising two frequencies f1 and f2 in which first and second logic state are represented by first and second periods of theoretical duration T1 and T2, wherein the first threshold period $\tau$ is the frequency average given by the following equation:

$$\tau = \frac{1}{f1 + f2} - 2\left[\frac{1}{T1} + \frac{1}{T2}\right].$$

8. A demodulator according to claim 1 wherein the first threshold period is the theoretical geometric average for periods between consecutive transitions.

9. A method of FSK (Frequency Shift Keying) demodulating comprising the steps of:

receiving and digitizing an FSK signal;

identifying first, second, third and fourth consecutive transitions of the FSK signal and the times of said transitions;

calculating a first period between the first and third transitions and a second period between the second and fourth transitions, and indicating a change of frequency in the signal when the first and second periods lie on opposite sides of a threshold period and no change of frequency when the first and second periods lie on the same side of the threshold period.

10. A method of FSK demodulating according to claim 9, further comprising the steps of:

identifying a fifth transition of a signal occurring less than a predetermined minimum time following one of the first, second, third and fourth transitions;

rejecting said fifth transition as illegal;

accepting said first, second, third and fourth transitions as consecutive legal transitions; and calculating said first period and said second period from said legal transitions.

* * * * *

UNITED STATES PATENT AND TRADEMARK OFFICE
CERTIFICATE OF CORRECTION

PATENT NO. : 5,339,333
DATED : August 16, 1994
INVENTOR(S) : Zehngut et al.

It is certified that error appears in the above-identified patent and that said Letters Patent is hereby corrected as shown below:

In Claim 7, Col. 6, line 55, the word "state" should be --states--.

In Claim 9, Col. 7, line 9, please replace "," with ";".

Signed and Sealed this

Twenty-fourth Day of January, 1995

*Attest:*

BRUCE LEHMAN

*Attesting Officer*     *Commissioner of Patents and Trademarks*